US005644304A

United States Patent [19]

Pavarotti et al.

[11] Patent Number: 5,644,304

[45] Date of Patent: Jul. 1, 1997

[54] AUTOMATIC CONTROL SYSTEM OF LIGHTS IN A SERIES CIRCUIT ILLUMINATION PLANT, IN PARTICULAR LIGHTS FOR AIRPORT SIGNALLING

[76] Inventors: Remo Pavarotti, Via Bernini 36, I-27045, Casteggio, Province of Pavia; Umberto Cazzani, Via Verdi 2, I-28049 Stresa, Province of Novara, both of Italy

[21] Appl. No.: 373,305

[22] PCT Filed: Jul. 20, 1993

[86] PCT No.: PCT/EP93/01920

§ 371 Date: Jan. 19, 1995

§ 102(e) Date: Jan. 19, 1995

[87] PCT Pub. No.: WO94/02919

PCT Pub. Date: Feb. 3, 1994

[30] Foreign Application Priority Data

Jul. 22, 1992 [IT] Italy .................................. MI92A1773

[51] Int. Cl.$^{6}$ .......................................................... B64F 1/18

[52] U.S. Cl. ........................... 340/953; 340/642; 315/130

[58] Field of Search ..................................... 340/642, 331, 340/953; 315/130, 131, 132, 133

[56] References Cited

U.S. PATENT DOCUMENTS

| | | | |
|---|---|---|---|
| 3,715,741 | 2/1973 | McWade et al. | 340/642 |
| 4,449,073 | 5/1984 | Mongoven et al. | 340/642 |
| 4,675,574 | 6/1987 | Delflache | 340/642 |
| 5,243,340 | 9/1993 | Norman et al. | 340/953 |
| 5,387,909 | 2/1995 | Neel et al. | 340/642 |

FOREIGN PATENT DOCUMENTS

| | | | |
|---|---|---|---|
| 0330164 | 8/1989 | European Pat. Off. . | |
| 0596012 | 2/1978 | Switzerland | 340/642 |
| 90/04242 | 4/1990 | WIPO . | |

OTHER PUBLICATIONS

Patent Abstracts of Japan vol. 14, No. 182 (Apr. 12, 1990), 2–33893, Feb. 1990.

Patent Abstracts of Japan vol. 14, No. 557 (Dec. 11, 1990), 2–239595, Sep. 1990.

*Primary Examiner*—Brent A. Swarthout
*Attorney, Agent, or Firm*—Dilworth & Barrese

[57] ABSTRACT

An automatic control system for a series circuit, in particular for airport signaling lights, physically separated from the work circuit feeding the lights and galvanically separated from the latter, includes a computer; several Main Stations each containing several Main Modules, each controlling several Remote Modules which check and act on a single airport light, each of said Main and Remote Modules having firmware boards; a full duplex transmission network linking the computer with the Main Stations; each Remote Module has externally two pairs of electric terminals of which one pair is connected to the secondary of an insulating transformer making part of the work circuit and the other pair is connected to a light or a group of lights being controlled, the two pairs of electric terminals being connected to each other by electrical leads, wherein connected in series to one of the electrical leads is a coil which is magnetically coupled to a Hall sensor of the Remote Module; and further including an electronic device with controlled conduction having two conducting terminals and a control terminal, each conducting terminal connected with one of the electric leads while the control terminal is connected to circuitry which connects the electronic device magnetically to internal circuitry of the Remote Module itself.

23 Claims, 13 Drawing Sheets

AUTOMATIC CONTROL SYSTEM OF LIGHTS IN A SERIES CIRCUIT ILLUMINATION PLANT, IN PARTICULAR LIGHTS FOR AIRPORT SIGNALLING

BACKGROUND OF THE INVENTION

This invention concerns an automatic control system of lights in a series circuit illumination system, in particular for lights for airport signalling. It is furthermore possible to utilize the same system for automatic control of road or motorway (motorway crossings or ramps) illumination plants or even for controlling the illumination plant of large industrial areas.

Airport signalling lights or runway lights are not limited to those which illuminate the landing strip to make it well visible to pilots, but also include the taxiway or runway centerline lights which are arranged on the axis of the taxiways, the take-off strip and the routes between the taxiway and the various parking areas. The characteristics, arrangement and functioning of these lights are disciplined by the regulations of the ICAO (International Civil Aviation Organization) which is the international body which controls flight regulations including also those to be respected in the movement of aircraft and vehicles on the ground, in order to guarantee collective safety. The presence of these lights has, in fact, the purpose of giving the pilots and drivers of vehicles circulating in the airport area (such as ambulances, fire engines, vehicles for passenger transport, vehicles for baggage transport, etc) an exact indication of the whereabouts of various airport sectors which can be driven on also in conditions of unfavorable visibility, in particular enabling aircraft pilots to avoid any collisions with the wing tips and to align the aircraft along the axis of the taxiways and the take-off strip.

The use of lights for airport signalling has been proposed in the art as a visual means for disciplining the airport ground traffic in a centralized manner and thus taking it away from the judgement of individual drivers, something which, however, leads to situations of chaos very similar to those encountered in urban motor vehicle traffic. In particular, from the control tower the central lights of the route to be taken are activated progressively in front of the aircraft or motor vehicle to be moved, which is thus enabled to follow. At the intersection between two or more taxiways stop bar lights are positioned horizontally and across the entire width of the individual taxiway. Said stop bar lights if lit up indicate the obligation to stop. In short it concerns a "stop-go" system of guiding the pilot or driver of the motor vehicle, which substitutes and surpasses the function of the classic "follow-me", that is the vehicle which precedes the aircraft at a short distance in front of it to indicate the route which it must follow. The activation of the switching on/off of the central lights present in various runways or taxiways may be carried out manually on the initiative of the personnel of the control tower, or preferably, automatically by means of the relative control system.

In their new function of "intelligent" traffic guiding, the airport signalling lights thus take on a fundamental role for achieving conditions of safety in airport ground traffic and thus are very important in all the above mentioned systems which control their operation automatically.

It is known from WO 90/04242 of a method and a system to supervise and check the field lights in an airport, regulate the intensity of the lights and to receive information regarding the condition of the lights, said method and said system being able to integrate further a system of ground traffic control connecting to proper presence detectors. Said method and said system, as appears clearly in the description of the above-mentioned document and from FIG. 2 thereof, concern almost exclusively the feeding systems of the "parallel" type airport lighting, which is not considered to operate in "series" type systems. It is known for this purpose that the majority of "parallel" type feeding systems for the electrical current of airport lights is realized through DC regulators, series circuits and series transformers for one or more lamps (see diagram 1 of FIG. 1 of WO 90/04242) and without using a "parallel" design (see diagram 2 of FIG. 1 of WO 90/04242). As is evident for a man skilled in the art, the application of the invention according to WO 90/04242 to the already existing "series" type system necessitates inevitably the exclusion of the DC regulators, the substitution of all the distribution cables and the exclusion of all the series field transformers. For what concerns modifications to "parallel" type circuits, they necessarily concern the exclusion of the regulators and the exclusion of the field transformers. From the above, it appears first that the system of WO 90/04242 is reasonably and economically usable only for new systems or, at most, for "parallel" type systems, whose distribution, presently at low level, is destined to diminish in the future.

Further, while the above-mentioned WO 90/04242 provides for the possibility of use for the transmission of data in a dedicated cable, only the use of the same circuitry for feeding through the technology of conveyed waves is described. Thus, there is in the first place the impossibility of switching off the control system of the WO 90/04242 and of the use of the manual system and, hence, in the event of damage or interruption of electric energy in the airport, the communication and the control of the physical position of the airplanes are made impossible.

Various control systems of this type have been proposed, which all have at least one central information processing and command unit, that is a computer, connected to peripheral control units by means of the same network circuit, that is the power circuit which feeds the various lights and regulates the intensity of the current passing through them.

This power supply is in a series circuit, in order that all the lights receive the same intensity of power and may emit the same intensity of brightness. More particularly the feeding of the individual lights occurs by means of the secondary of the same number of insulating transformers, whose primaries are connected in series by means of a suitable power cable. This is so that the burnout of a single lamp does not interrupt the continuity of the circuit and thus the power supply to the other lamps. Suitable devices connected to said cable, "Constant Current Regulators" or CCR, keep the intensity of the current flowing in said cable as constant as possible in the case of fluctuations in the power supply or in the event that some lights do not function and cause a strong unbalance of current to the primary of the transformer concerned and thus to the whole series circuit. So, if on one hand it may seem completely natural and perhaps even economical to exploit the work circuit which feeds the various lights to carry out controls on them, on the other hand it is easy to see that this may lead to various problems which do not make the operation of this type of system completely reliable. It is immediately noticeable, above all, that any physical malfunction in the work circuit prejudices parameters also in the operation of the superimposed control system, without one being able either to discern whether the malfunction originates in the work circuit or in some of the control system equipment. The transmission of the information of the control system by means of the work circuit will not then be as reliable as if a dedicated circuit were used, in that it is subject to all its own interference and those induced by the work circuit. Furthermore the on and off switch for the various lights, for the purpose of regulating airport ground traffic, is brought about by means of the commutators of the work circuit and consequently for sectors and zones, that is for groups of lights and not individual lights. The diagnosis of the working state of individual lights effected by systems known in the art allows the number of malfunctioning lights there are in the system to be established but not identification of which lights these are. This is a considerable problem in that, as it is not known which lights are not functioning, it is necessary to send personnel in a suitable vehicle to all the various runways and taxiways to find them and substitute them, which brings not only a considerable waste of time, but also further aggravation of the airport ground traffic.

A control system has also been proposed which though still exploiting the work circuit, feeds individual lights not by means of insulating transformers but rather by means of individual Light Control Units (LCU), that is electronic devices able to monitor the functioning of the light, to control its switching on or off as well as substitute the CCR in the regulation of the current which passes through the light and thus the intensity of brightness emitted.

Such a system, in theory, would eliminate some of the aforementioned problems in that it would allow the activation of lights individually and not in groups, as well as detecting which lights are broken. In the experimental tests carried out, however, complete inefficiency of the said system in carrying out its planned task of control emerged, the transmission of information on the work circuit being heavily distorted by disturbance. This is perhaps due to the fact that devices able to individualize and distinguish various types of vehicles which move on the runways are incorporated in series into the work circuit, which function on the principle of photocells by means of a "barrier" of microwaves. In any case, when these are functioning, this system would show the abovementioned limits of a control system which is physically superimposed on the work circuit. Furthermore both this and all the other systems known in the art may be installed on the airport runways or taxiways only by interrupting the power supply to the lights, therefore generating a period without service, and only by modifying the work circuit.

SUMMARY OF THE INVENTION

The control system according to this invention overcomes all the problems presented by the systems according to the known art, achieving in a really reliable manner, continuous, automatic and complete control of the airport lights and satisfying the specifications required by the ICAO. It is characterised in that it is physically distinct from the work circuit feeding the lights and galvanically separated from the latter. This system, in fact, has autonomous circuits, electrically separated from the power circuits, distributed along the airport runways or taxiways. The transmission of the information and the feeding of various components occurs through a dedicated cable, thus avoiding the complications and poor reliability deriving from the use of an already existing power cable of the airport signalling lights; furthermore, without any interruption of the service, the installation of the system may take place in the working airport and does not bring any modification to the work circuit.

The system may control any type of airport light and may be extended to different series circuits, if this is the configuration of the work circuit of that particular airport. This system allows the lights to be switched on and off directly, that is without carrying out those commands by means of the work circuit and, more importantly, allows them to be worked individually and not all together. During operation, the system is self-diagnosing and communicates any anomalies in an intelligible form for the human operator, as well as activating relative alarms if necessary. The information rendered and the commands given by the peripheral units of the system are collected by one or more principle stations controlled by a dedicated data network constantly connected to a computer, of size and power chosen in relation to the size of the airport or to the applied systems utilised. The presence of a suitable sensor is also foreseen for each light, adapted to distinguish and communicate the level of cleanliness of the external glass of the respective container, which could get dirty for many reasons. The possibility of such an indicator, not provided for by any of the systems according to known art, is however very precious, in that the lights should be well visible even in adverse weather conditions. The information coming from all sensors distributed on the various airport runways and taxiways and able to recognise and distinguish the aircraft and vehicles which move on these runways and taxiways may also flow in this system. By equipping it with suitable software, the system may be able, by processing all the data it receives including those input by an operator, to determine the lights to be switched on or off in order to direct the traffic opportunely. It is proposed therefore as a complete system for controlling airport ground traffic.

BRIEF DESCRIPTION OF THE DRAWINGS

All that stated hereinbefore will be clearer from the following detailed description and from examination of the figures on the appended sheets of illustrative drawings, given purely as an example and not limiting the invention itself.

More particularly.

DESCRIPTION OF THE PREFERRED EMBODIMENTS

Figure 1:
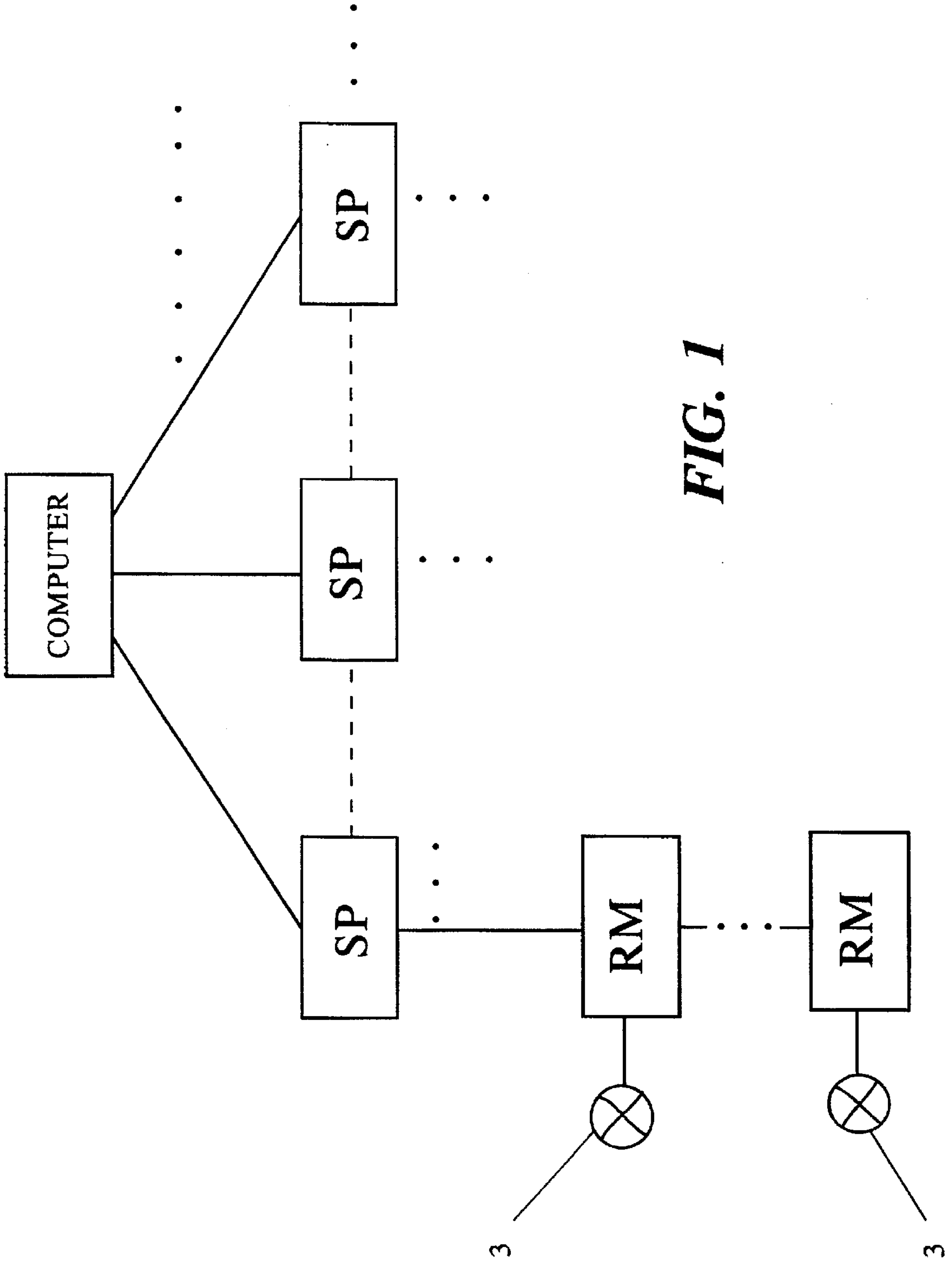
FIG. 1 shows a simplified tree diagram of the system according to the invention.

The logical structure of the system according to the invention is that illustrated schematically in FIG. 1 and has a computer of size and power in proportion to the size of the airport and applied programs adopted which are connected to a certain number of main stations, SP, in turn connected to Remote Modules, RM, each connected to a single airport light 3. All the information coming from the sensors distributed on the airport runways and taxiways, able to reveal the presence of vehicles and aircraft on such runways and taxiways, to distinguish whether they are motor vehicles or aircraft, as well as revealing the presence of aircraft in the phases of take-off or approach, are also input in the computer, with an autonomous physical support. The main stations, as indicated in the broken lines marked on the figure, are also connected to each other in data networks. Each of these is supplied with an autonomous feeding by means of two feeders one as a back-up to the other in order to guarantee operation also when one of the latter breaks down or runs out. The feeders serve in particular for the operation of the Main Modules named MM01, individual firmware board that is electronic devices with an incorporated function program which are positioned in relative compartments of the structure constituting the Main Station.

Each main station may contain from 1 to 2 Main Modules, each of these may control from 1 to 2 Remote Modules. Each MM01 has 8 channels and each control channel has from 1 to 60 remote modules. The Remote modules, also electronic devices with an incorporated function program, in turn control a single airport light, in the case of Remote Module RM01 but it is also possible that some of these may control a group of lights, in the case of Remote Module RM02 for example provided that these have the same physical location and thus act as far as the external effects are concerned as a single light (have a single "address"). The Remote Modules belonging to the same Main Station are connected to each other by the same cable, which in addition to supplying them with the physical support for information exchange also supplies the feeding necessary for their operation.

Figure 2:
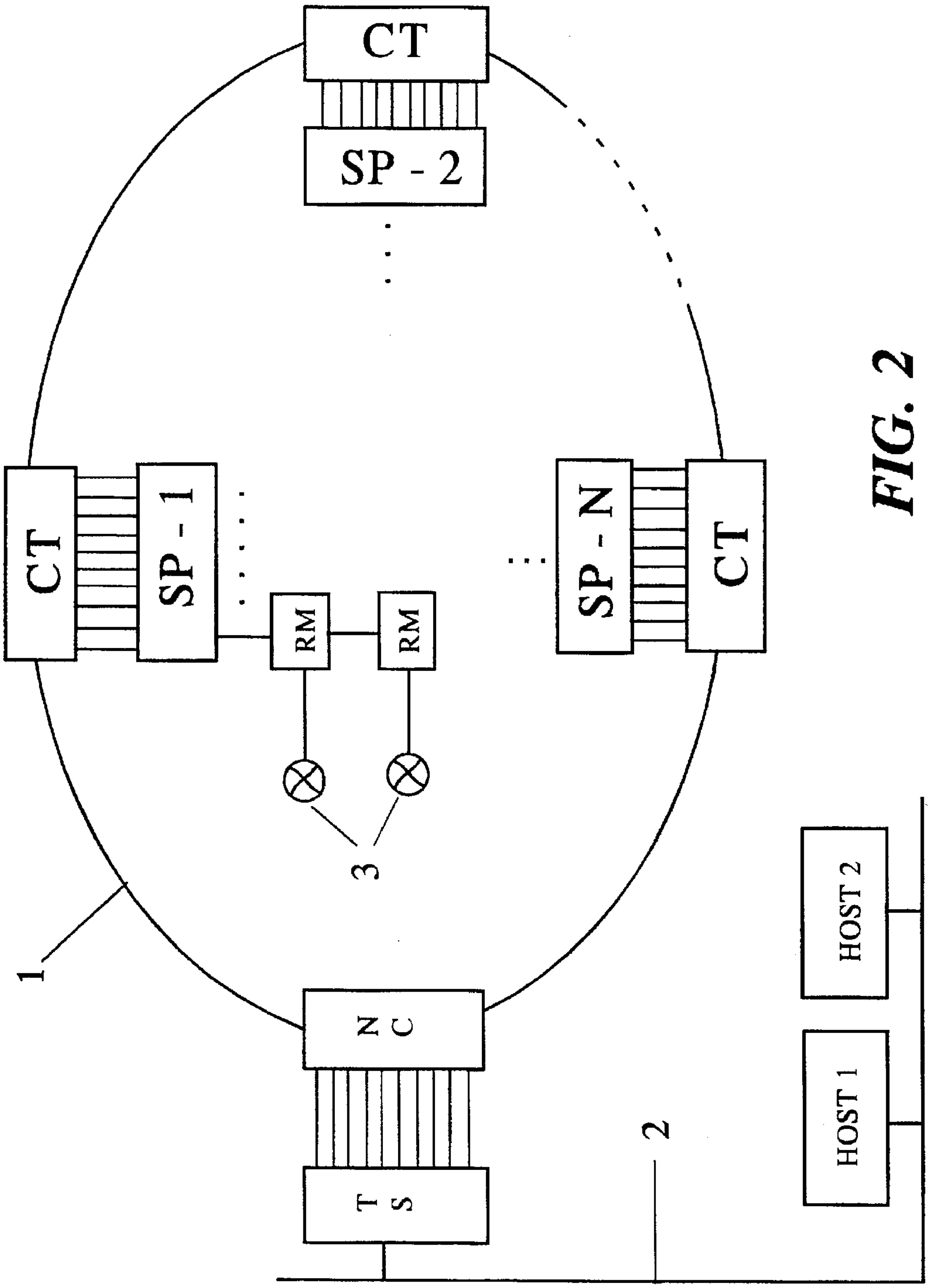
FIG. 2 shows the topology of the data transmission network utilised by the system.

The effective topology of the network which connects the various elements represented in FIG. 1 is shown schematically in FIG. 2. The various main stations, SP-1, SP-2, . . . SP-N, are connected to each other by a ring network 1, preferably made of coaxial cable or of optical fibre, which may reach a maximum circumference of 120 km with a transmission speed which will be about 10 Mbit/s.

Their access to this network occurs by means of concentrators CT, connected to the outputs RS232 of Main modules contained in a single Main Station. The data transmission speed between the main stations and relative concentrators will be more or less 9600 Baud. In the ring a Concentrator Node NC is also present which concentrates and communicates data to the concentrators on one side and dialogs from the other towards the serial ports of a Service Terminal TS, connected by network 2, which in particular may be an Ethernet network, with two computers in cluster with them HOST1 and HOST2. One of these two computers is a back-up and being constantly up-dated with the information contained in the other may start functioning at any moment if the latter should break-down, thus without any lack of service to the global system. As already mentioned, the Remote Modules controlled by the said Main Module are connected to each other by a cable, for example a FCS01, which as well as establishing a two-way full-duplex data network operating at a speed which will be of 4800 Baud also carries on a separate conductor the power supply necessary for their operation. The energy is derived from suitable local feeders AL, not shown in the figure, distributed along the cable on the basis of the foreseen absorption. The communication of data towards the Remote Modules will preferably be carried out with protocol RS422, in order to guarantee both its immunity to disturbance and excess of the distances required by the application.

Figure 3:
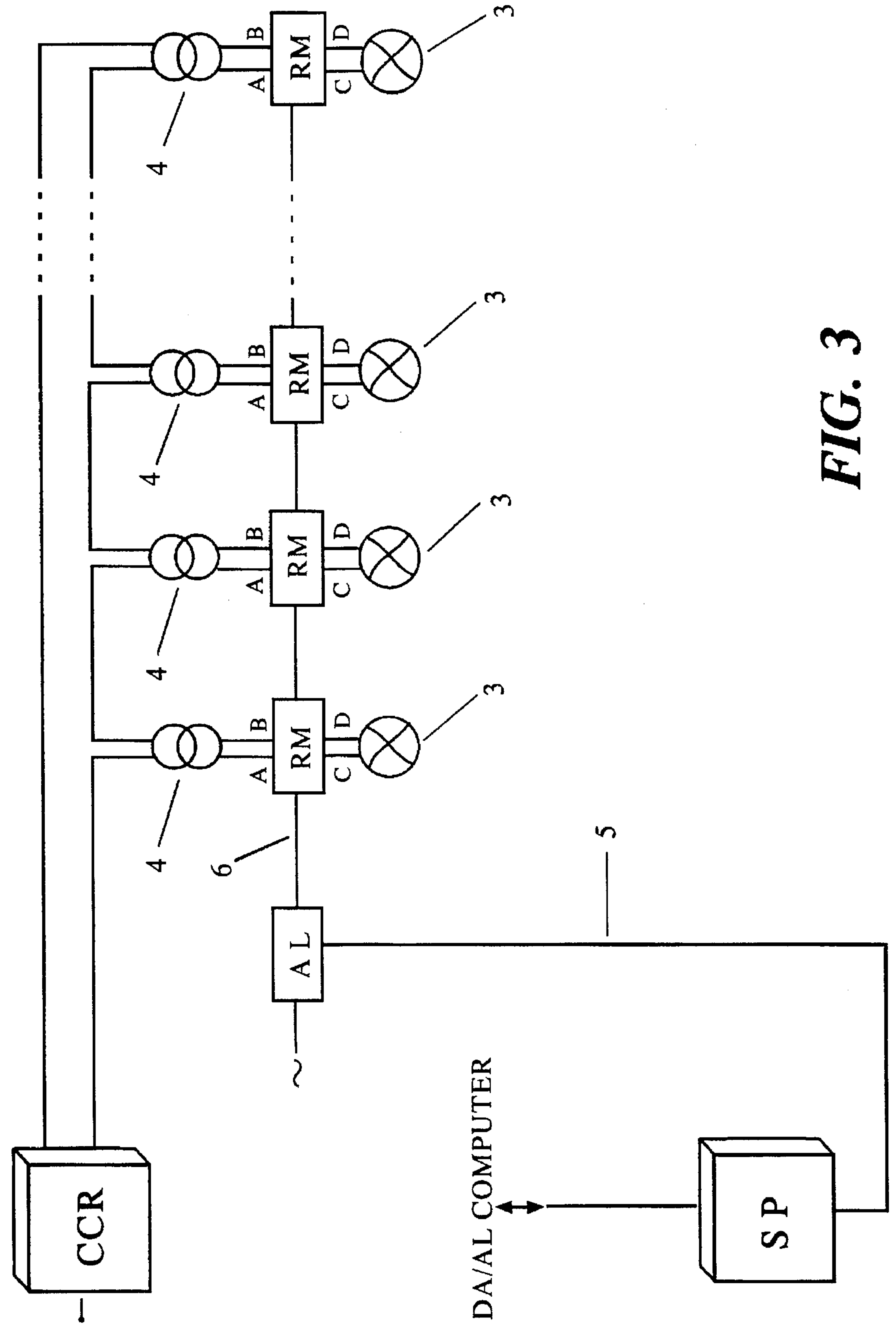
FIG. 3 shows a simplified diagram of circuit connection between the system, light feeding network and lights.

The circuit connection diagram between the system under examination, the work circuit feeding the airport lights and said lights is shown in a simplified manner in FIG. 3. As one can see, the feeding of the light 3 no longer occurs directly from the secondaries of the isolation transformers 4 of which the primaries are connected in series to each other and to the CCR, but rather by means of the intervention of individual Remote Modules, of which the terminals A-B and C-D of connection to said transformers and to the lights respectively are marked. The Remote Modules thus represent the ring of connection between the control system according to the invention and the work circuit, but the effective electrical connection between these two is such as to determine only their magnetic coupling and no coupling of electric type, thus guaranteeing the galvanic separation of the two circuits. The Remote Module RM01 receiving the commands with protocol hardware 422 and ASCII software carries out the functions of switching the light on and off, making the light flash, resetting the circuit and testing the light. For RM02 the same applies with the only difference that it concerns two lights which are independent from each other. Furthermore a Remote Module RM05 is provided which is adapted to receive 16 sensor and control 6 outputs for their diagnosis or arrange for particular functions. In FIG. 3 a local feeder AL, is also represented, hereinafter also defined Power Inserter, which resupplies energy to the individual Remote Modules, to emphasise that the feeding of the various components of the system is totally autonomous. Linked to the Local Feeder is also the lead 5 from the Main Station, SP, said lead carries the data and proceeds towards the various Remote Modules grouped within the same cable 6 with the conductor which carries the input being electrically insulated from this.

Figure 4:
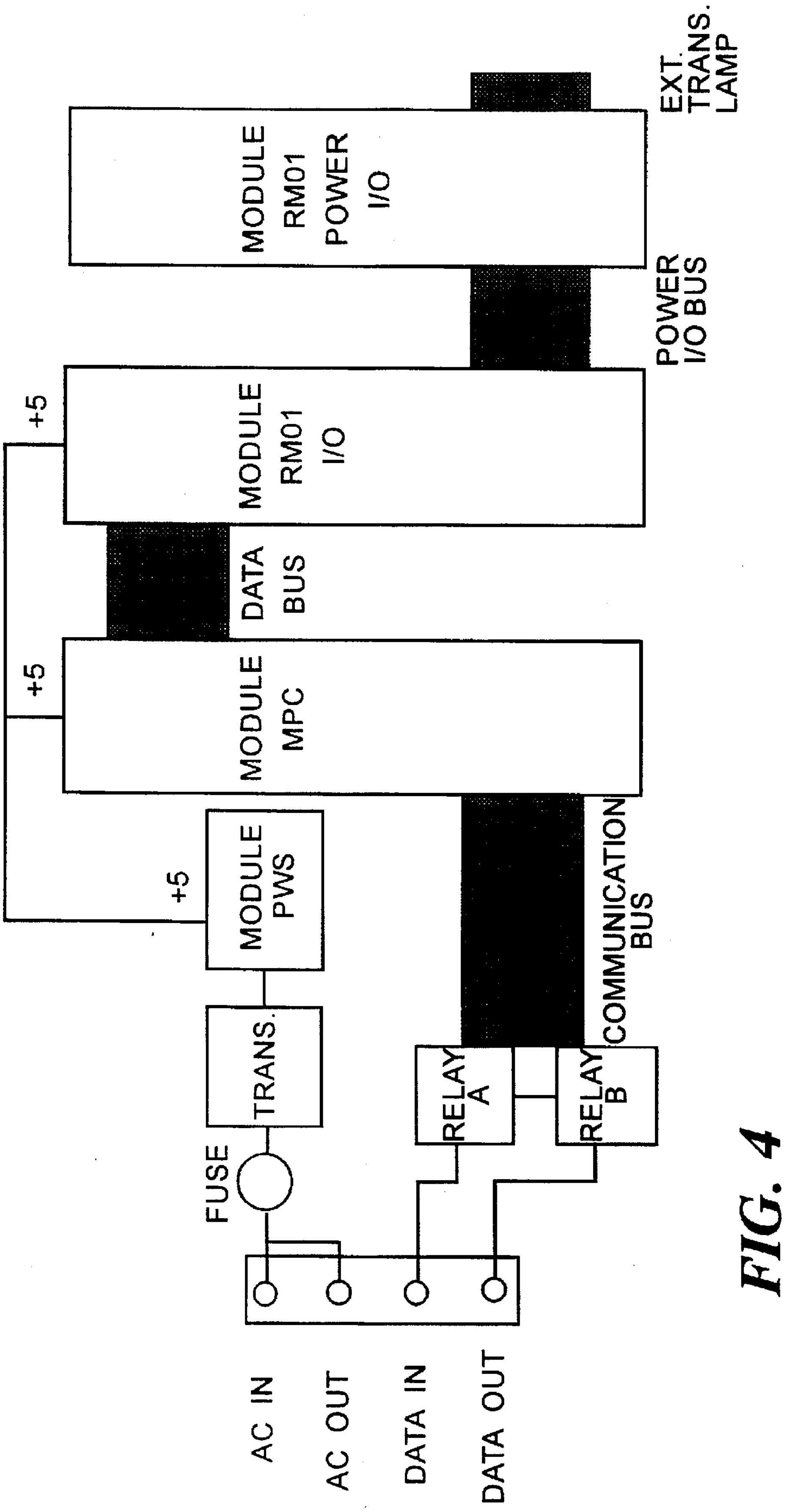
FIG. 4 shows a general block diagram of a Remote Module.

In FIG. 4 a general block diagram is reproduced of a preferred embodiment of a Remote Module RM01 (totally similar to that relative to RM02) which acts on a single airport light (RM02 acts on two lights in an independent way). With reference therefore to FIG. 4 it will be possible to understand the functioning of said Remote Module.

The voltage AC IN is distrubuted on AC OUT towards the other RM01. The phase through the fuse is sent to the transformer which feeds the module "PWS" which in turn feeds the two modules "MPC" and "RM01 I/O". The path of IN and OUT data passes through the contacts of the relays A, B before arriving at the Communication Bus of the "MPC" module. The "MPC" module processes all the serial data coming from the Communication Bus and transfers them in parallel towards the Data Bus. The Data Bus, like the Communication Bus, is two-way, therefore the data of the Data Bus coming from the module "RM01 I/O" are transferred towards the Communication Bus and vice versa. The Power Bus I/O is parallel and routes towards the module "RM01 power I/O" the commands to be carried out and also receives, the indications on the state of the light which it communicates to the module "RM01 I/O".

Hereinafter is a more detailed description of the individual modules and buses which constitute the individual Remote Module. In particular reference is made to a Remote Module of the type RM01 which acts on an individual light.

Figure 5:
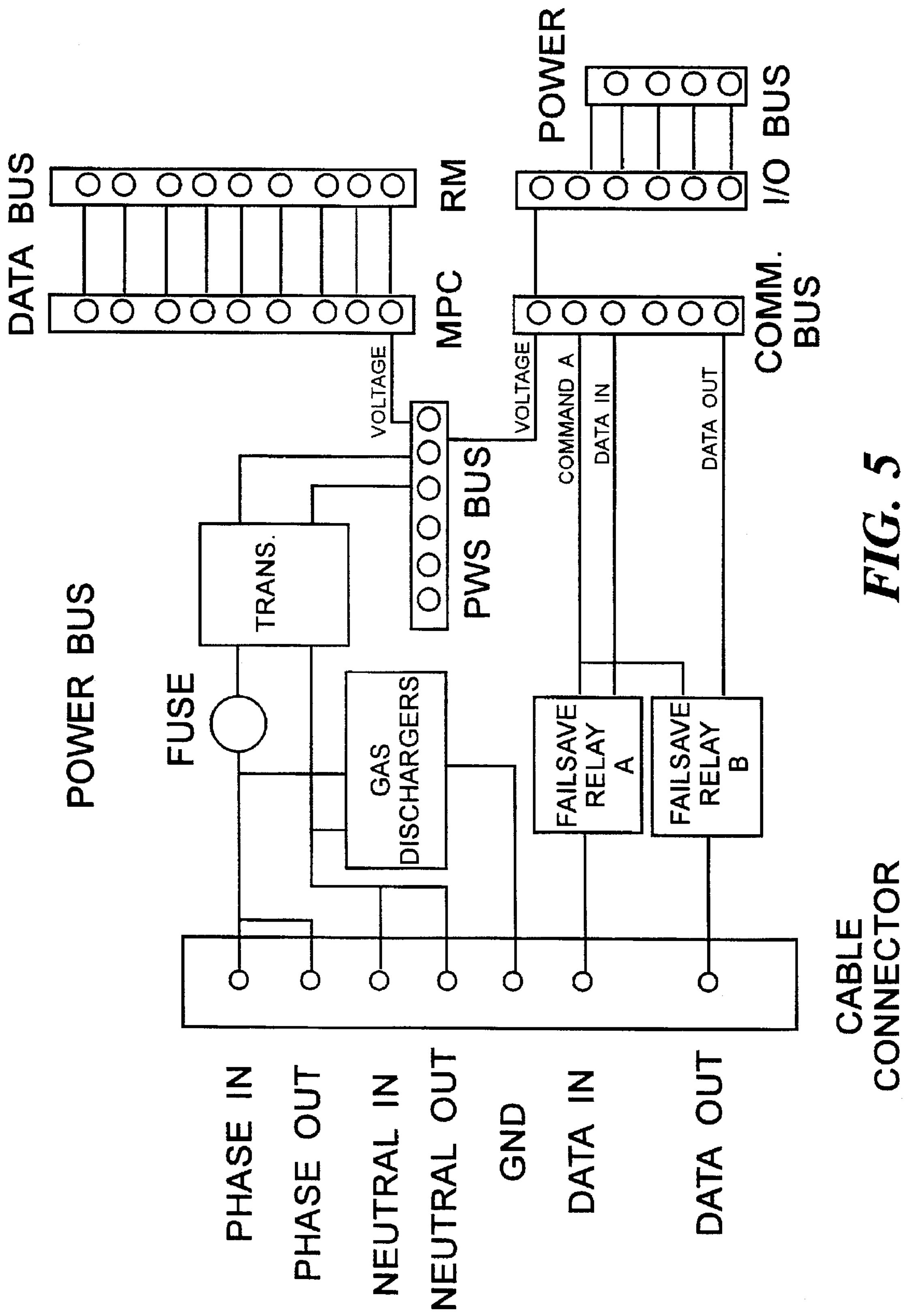
FIG. 5 shows a general block diagram of the POWER BUS.

The block diagram of the Power Bus Module is shown in FIG. 5.

This circuit is the mother board with all the Bus and passive components such as the transformer, the fuse and the relays and the gas dischargers.

The Cables Connector TERM A receives the voltage AC and the data and transfers them to the successive RM01 as well as to the circuit inside it. The fuse protects the transformer on the phase and is a semi-delayed type of 0.5 Amp.

The transformer receives a voltage of 220 V which guarantees loadless a voltage of 17.6 V on the secondary and is able to supply a maximum current of 267 mA.

In the PWS Bus the POWER SUPPLY module, described hereinafter is inserted, which generates a voltage of +5, to feed the modules "MPC" and "RM01 I/O", and a voltage of UNREG, to feed the relays A, B.

The "MPC" module is inserted on the Data Bus and on the Communication Bus. The module "RM01 I/O" is inserted on the Data Bus and on the RM01 I/O Bus. The "RM01 POWER I/O" module is connected by means of a 5-wire cable to the Power I/O bus connector.

The relays A, B guarantee the progress of the signals 422 between IN and OUT. The gas dischargers G1, and G2 inserted respectively between the phase and the earth and between the neutral and the earth trigger for AC voltages greater than 248 V to protect the transformer and the AC feeding line.

Figure 6:
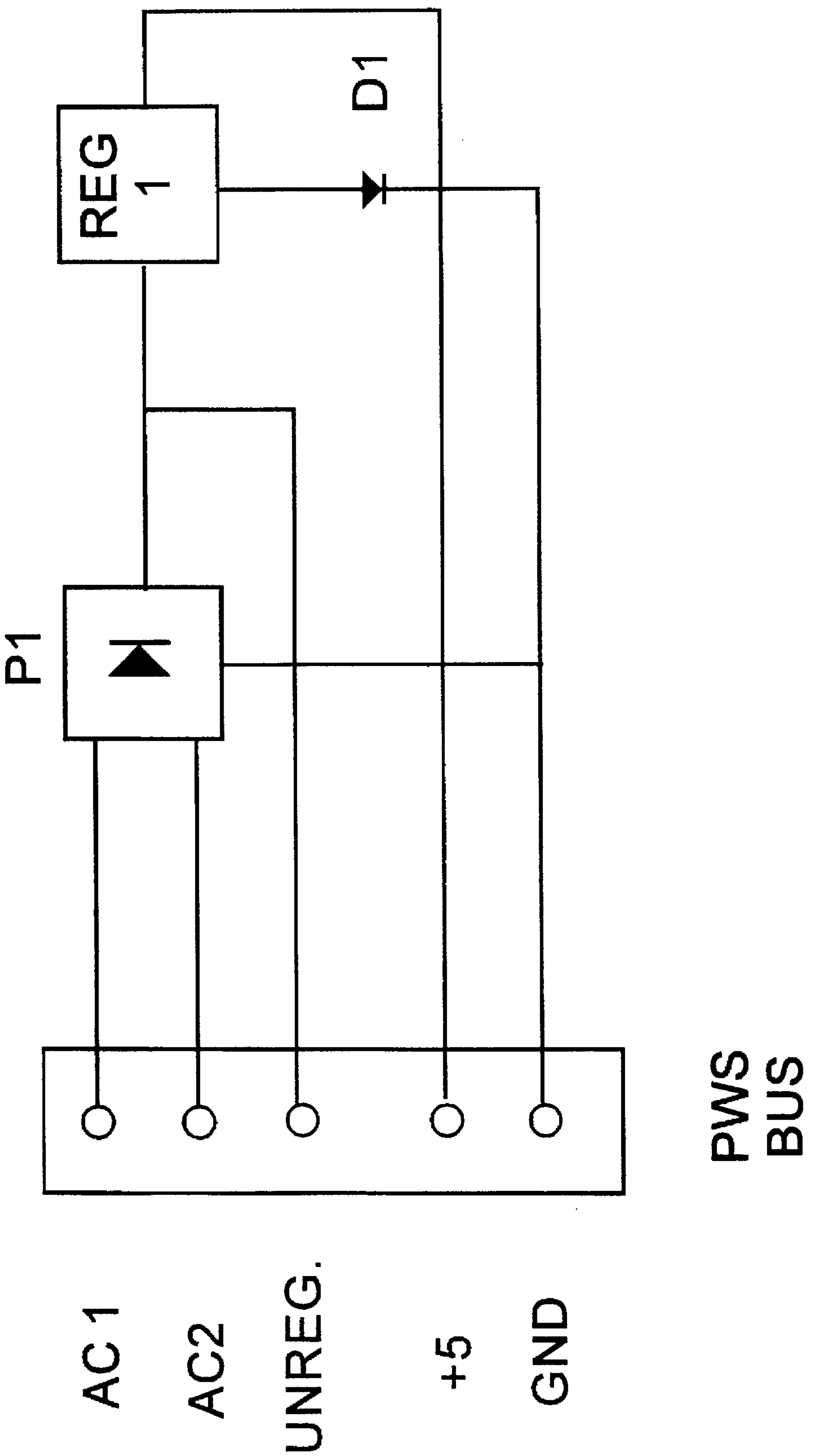
FIG. 6 shows a general block diagram of the POWER SUPPLY.

The operation of the POWER SUPPLY module is now described with reference to FIG. 6.

The power supply circuit receives the alternate voltage from PWS BUS (AC1, AC2) which, charged with an input voltage to the transformer of the circuit of the POWER BUS module of 225 Vac, guarantees a continuous input voltage of the regulator of 12,6 Vdc.

The regulator chosen is of low drop out of about 0.5 V, with a maximum current of 1 Amp, this guarantees a low dissipation and a larger range of the input voltage. It is also protected from polarity inversion and short circuiting in output.

The working temperature varies from –40° to +125° C.

Its input, if in excess of the maximum working voltage for a maximum time of 100 mS at 60 V, is able to protect itself and the charge.

The diode D1 serves to increase the output voltage of the regulator by 0.7 V.

The output of +5 serves to feed all the RM01 modules, while that not regulated (UNREG.) feeds the relay of the FAILSAVE circuit.

Figure 7:
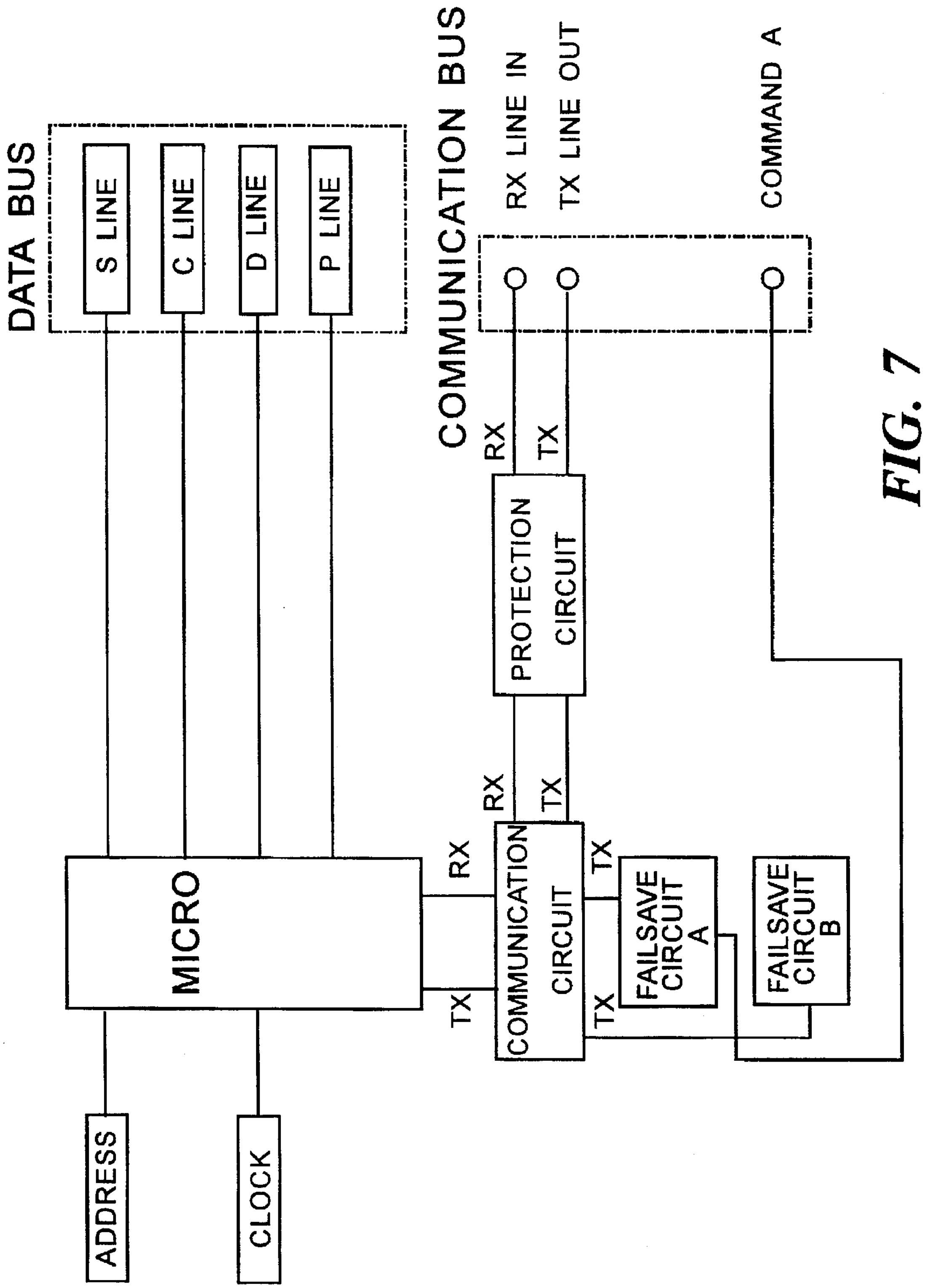
FIG. 7 shows a general block diagram of a MPC.

The module MPC (see FIG. 7) comprises three fundamental circuits: Micro Processor Circuit IC1, Communication circuit IC2, IC3 and data cable continuity circuit (FAILSAVE).

In the preferred embodiment the MPC module (Micro processor) is based fundamentally on a commercially available integrated circuit.

Figure 8:
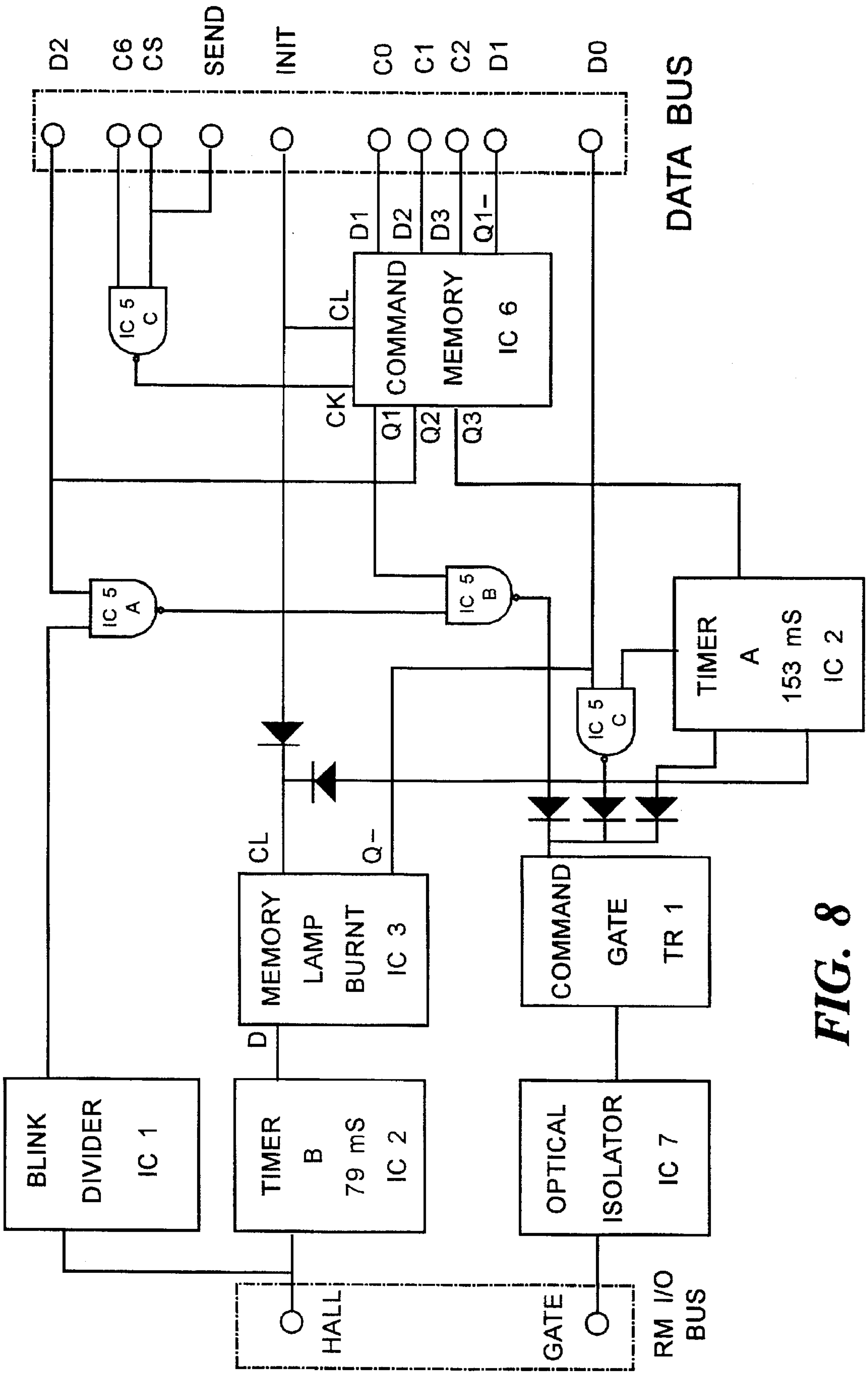
FIG. 8 shows a general block diagram of a RM01 I/O.
Figure 9:
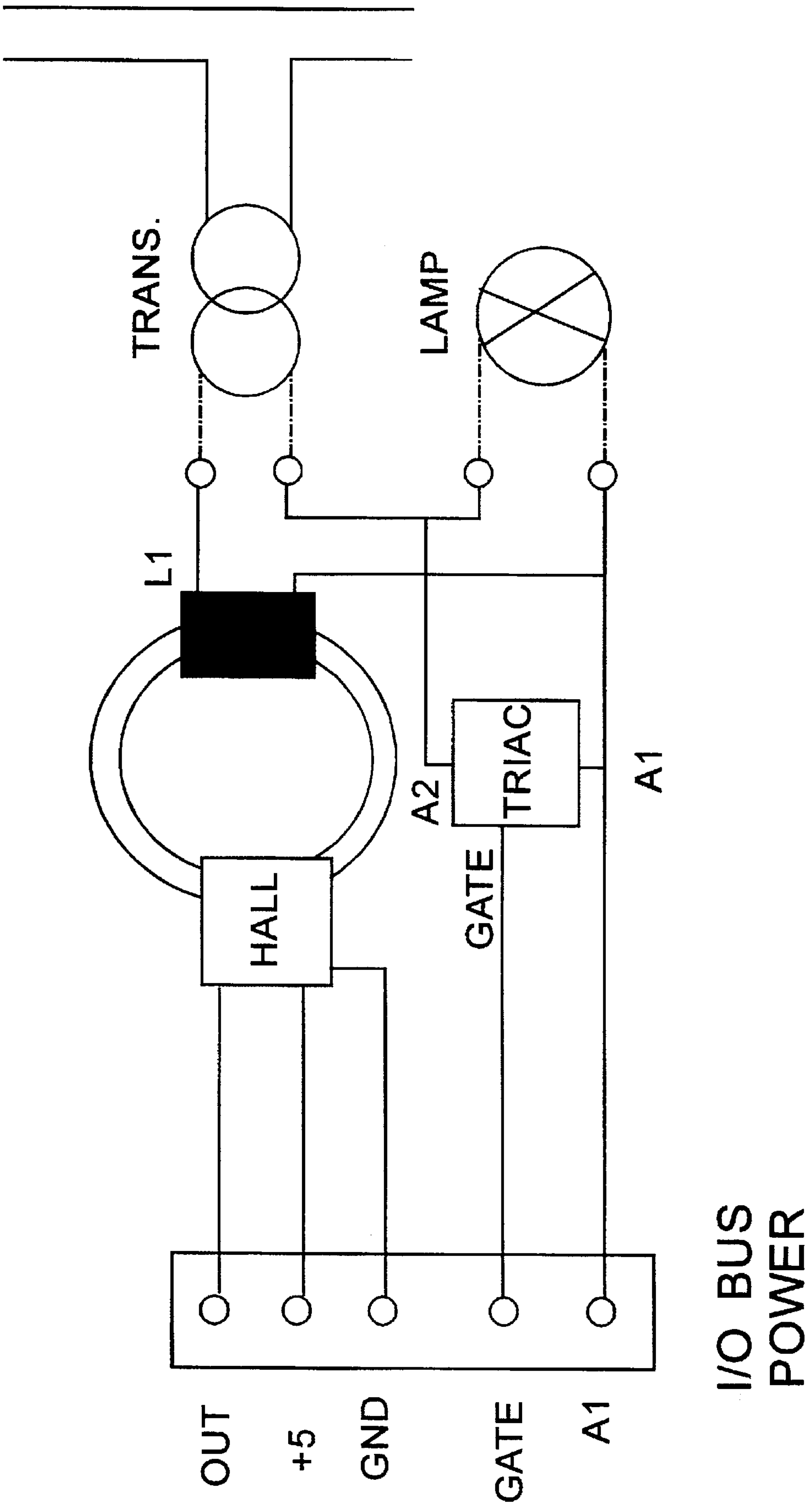
FIG. 9 shows a general block diagram of a RM01 I/O POWER.

Hereinafter follows a brief comment on I/O RM01 module (see FIG. 8).

The signal coming from the Hall sensor is applied to two integrated circuits.

IC1 which divides the frequency in order to create a Blink time of 1.5 S.

IC2 timer B which considers the light as burnt out after 79 mS, a loss of about 3 cycles, and memorises the state in IC3.

IC2, furthermore, blocks the gate IC5 which does not allow the reset of the memory IC3 until the light is repaired.

The INIT signal is generated by the "MPC" module and utilised to set both the memory IC3 and the command memory IC 6 to zero at the moment of switching on.

The gate IC 5C by means of bit C6 determines whether the byte in arrival is a command or only a test.

The signal CS is generated by the module "MPC" and is united to the signal SEND and permits the transmission of the byte of the state defined on the D line.

The timer A (IC 2) of 153 mS enables the command gate TR1 in order to verify if the previously burnt out light has been substituted, if this replacement is confirmed by means of IC 5D it resets the memory IC 3 which shows the line D0 L that the light is OK.

The time of IC 2A is greater than IC 2B to allow the latter to verify whether, at the activation of the command gate TR 1, the light is still burnt out or has been replaced.

IC 5B activates and disactivates the command gate TR1 as a function of the command present on Q1 of IC 6 (off-on) and if it finds it on and Q2 is activated (blink) it verifies the passage of the blink frequency generated by IC 1.

The command gate TR1 commands IC 7 directly which being an optical insulator with a TRIAC output may command the TRIAC power gate mounted on a "RM01 POWER I/O" module.

The "2RM 01 I/O" module absorbs the feeding of about +5–15 mA.

To conclude the comment of the components of the block diagram of the Remote Module RM01 it is useful to refer to the block diagram of "I/O POWER RM01" module.

The current of the secondary circuit of the transformer, passing through the shading coils of $L_1$ (preferably 8 shading coils formed with a double row of 1 mm diameter wound on a toroid) generates a variation of magnetic flux which, revealed by a Hall sensor, produces a CMOS compatible output.

The GATE and $A_1$ signals generated by the RM01 I/O module trigger the TRC1 which short-circuits the light.

The connection between the Remote Modules and the MM01 (interface between the Personal Computer of the Master Station and the Remote Module) occurs by means of cables defined with the commercial number FCS01. This particular cable is formed by two shielded couples and two electric leads: the couples are utilised to transmit data from the MM01 thus allowing a two-way transmission in Full Duplex.

Figure 10:
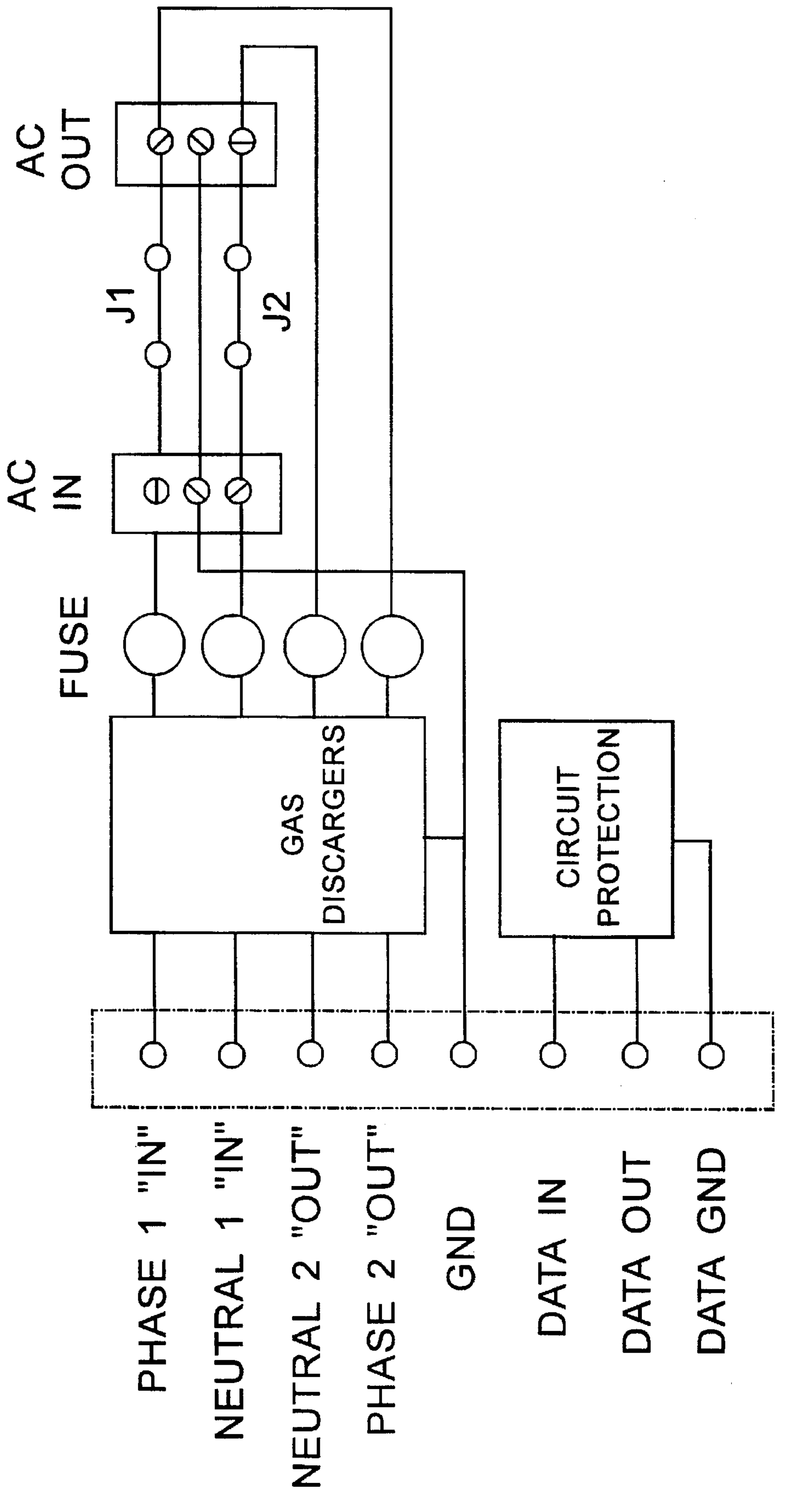
FIG. 10 shows a general block diagram of a POWER INSERTER.
Figure 11:
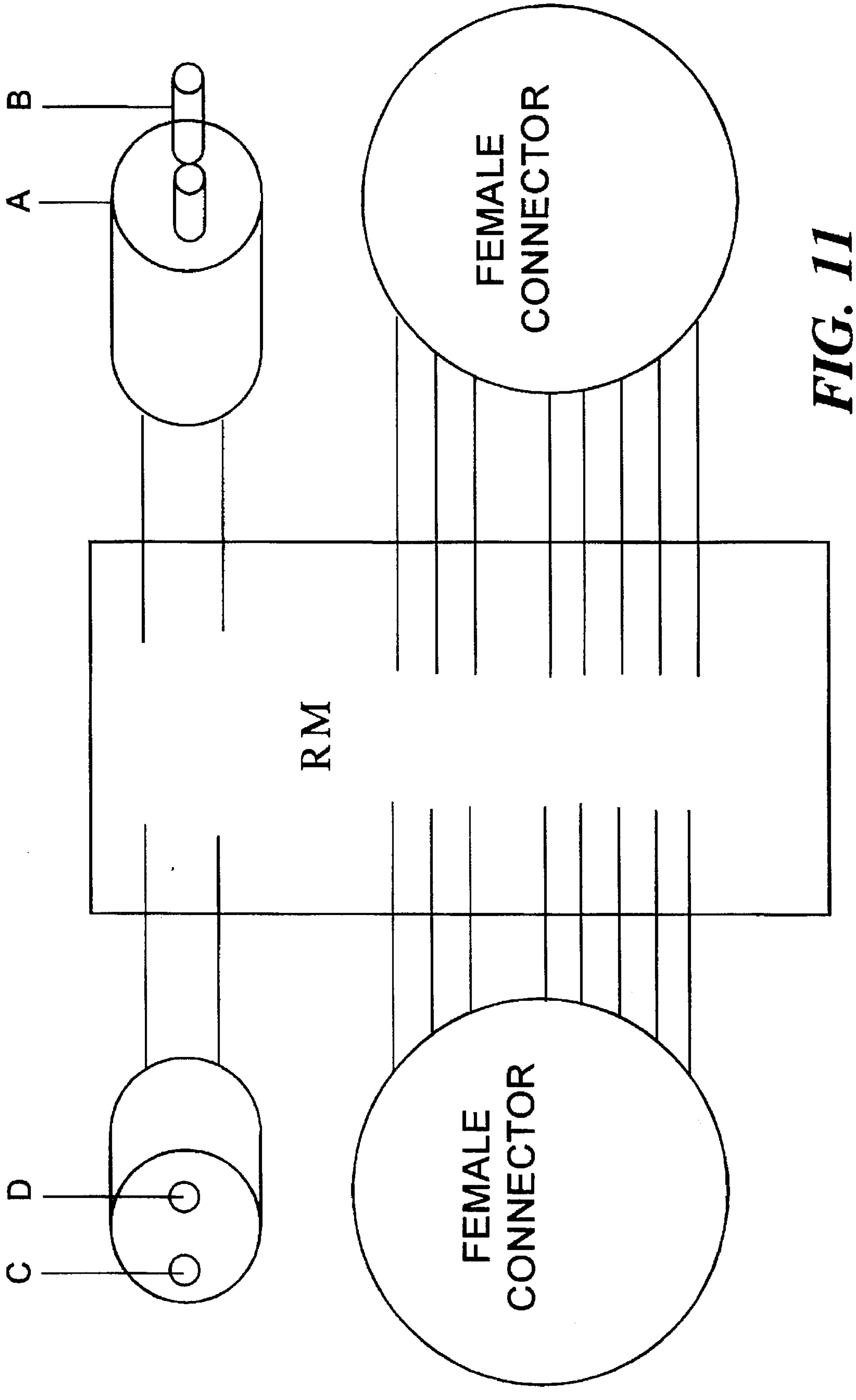
FIG. 11 shows schematically the external electric connections in the Remote Module.

Furthermore a component, the so-called Power Insert, see FIG. 10, is provided for which permits the AC feeder to be inserted in any point of the branch of the RM01.

It is protected by gas dischargers on the AC line and by disturbance blankers on the data lines which are only passing through and are not processed.

In addition to protecting from any overload, the fuses determine which branch is fed. The main feeding is input by means of a connector.

It is also predisposed if necessary for input of a step-up transformer in case the cable FCS01 should be too long and the AC voltage not come within the specifications of the RM01.

In summary, the main functions of the Remote Module are:

automatic closure of the secondary circuit of the primary network of the airport lights in the case of burnout of the filament of the bulb;

possibility or turning on or off one or more lights contemporaneously;

automatic disconnection of the network in the case of malfunctioning;

possibilty of commanding the signal generated by the sensor on the inside of the light, which defines the lens as dirty;

transfers the signals of the "STATE OF THE LIGHT" towards the main module:

ON

OFF

DIRTY

BURNT OUT individually or combined (excluding obviously the state of ON and OFF);

maintains, in the case of "OFF" a passage of current in the filament of the light, to avoid sharp variations in temperature and thus guarantee a larger duration of the same;

gradual turning on and off to avoid damaging the filament.

It is also possible to use the so-called BLIP in substitution of the Remote Modules. These BLIP are fed by the secondary circuit and have the function of checking the state of the light but do not give any command to the latter.

Figure 12:
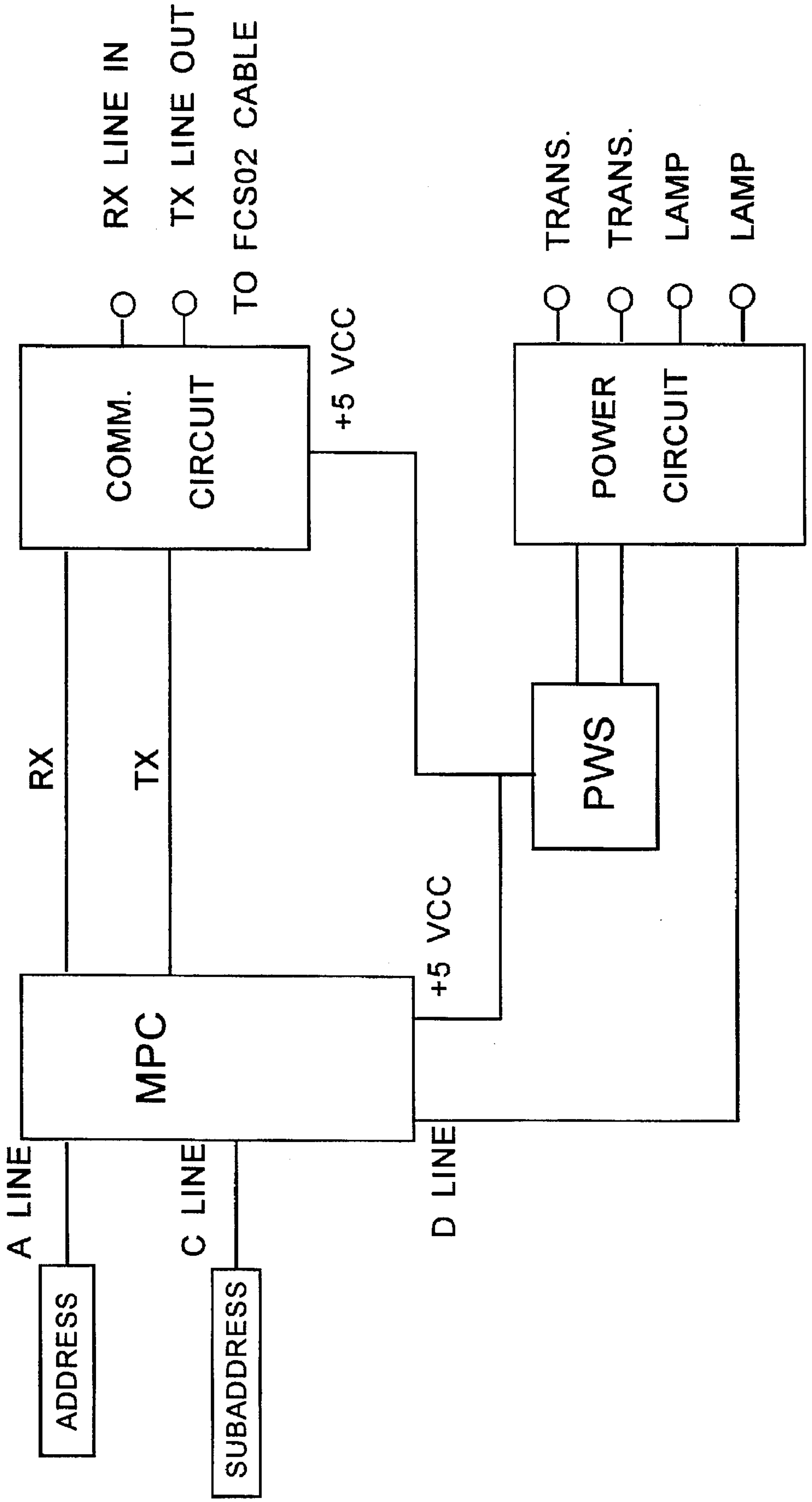
FIG. 12 shows a general block diagram of a BLIP.

In FIG. 12 the block diagram of the said BLIP is reproduced. The BLIP, receiving the commands with protocol hardware 422 and ASCII software, carries out the function of checking the burnt out light, of automatic short-circuiting of the secondary in the case of a burnt out light and automatic restoration of the short-circuit on substitution of the light.

The circuit controlled by the microprocessor "MPC" defines the primary address on the "A line" and the subaddress on the "C line". The data coming from the power circuit which reveals the state of the light is transmitted on the "D line". The communication circuit transforms the signals in input and output in 422 to be transferred by means of cable FCS02 to the successive or preceding BLIP units. The power circuit furthermore supplies continuous feeding of +5 to all the components of the BLIP unit.

The cable defined FCS02 connects the BLIP towards the MM01 interface and, on the contrary, connects the MM01 interface to the BLIP. This particular cable is formed by two shielded couples. One of the couples is used to transmit the data from MM01 to the BLIP and the other from the BLIP to the MM01 thus permitting a two-way full duplex transmission.

In the preferred embodiment the BLIP module is fundamentally based on a commercially available microprocessor.

This comprises three fundamental circuits: a microprocessor circuit, a communication circuit and a power circuit.

Figure 13:
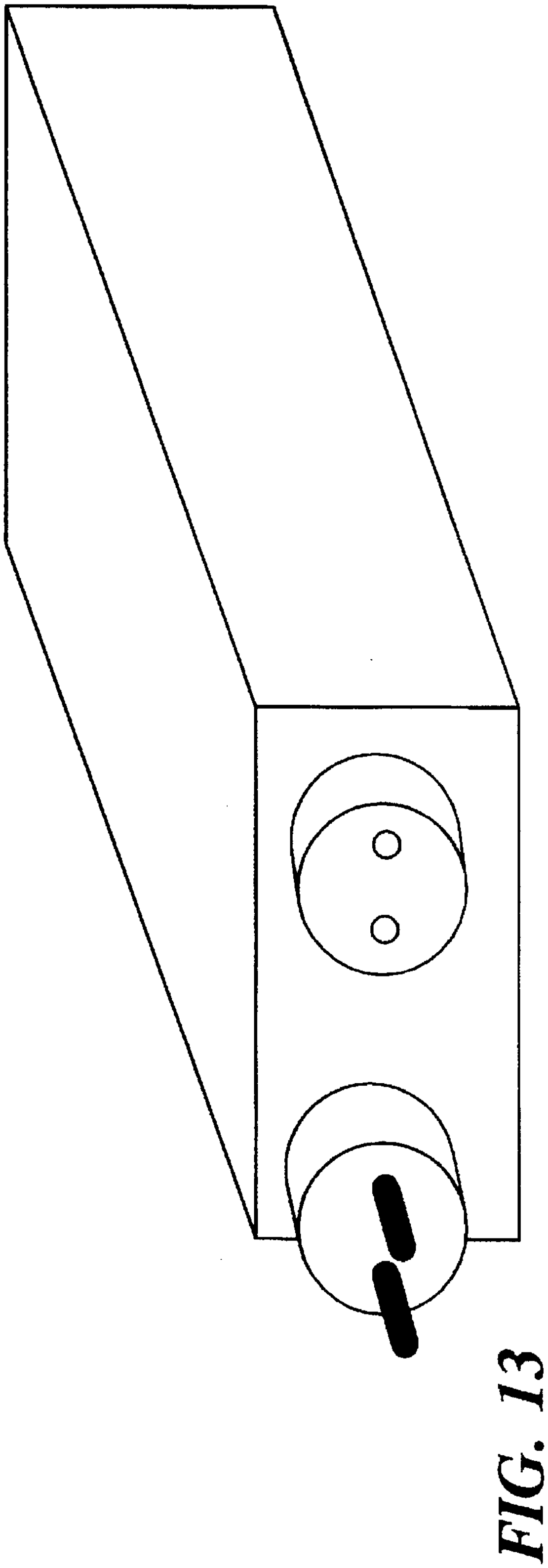
FIG. 13 shows the connection side of a transformer-lamp in a BLIP.
Figure 14:
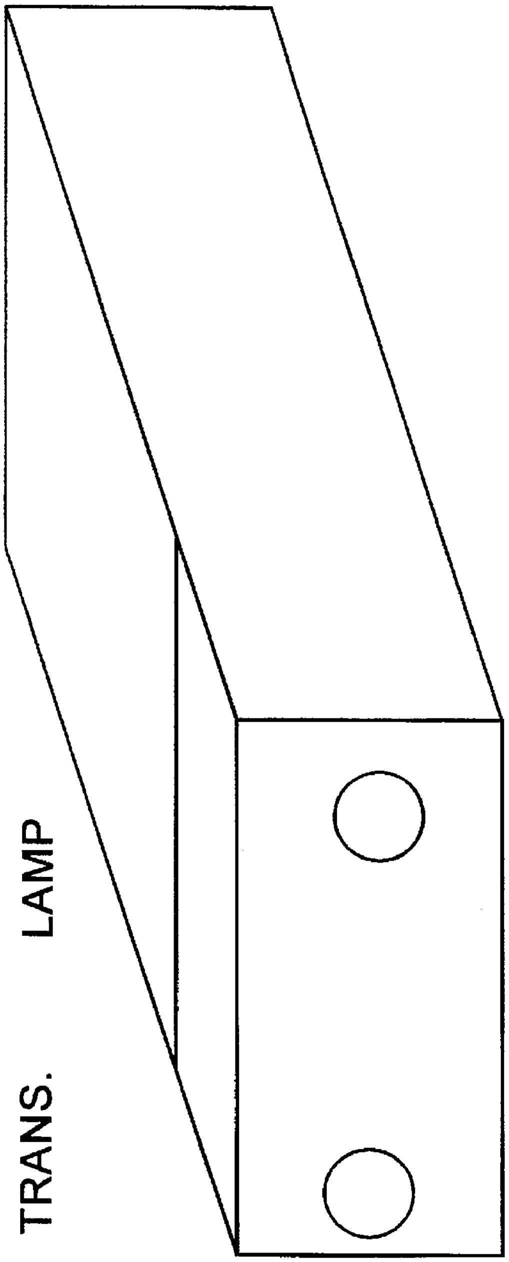
FIG. 14 shows the connection side with the cable in a BLIP.

FIGS. 13 and 14 show respectively the side of the BLIP with connection to the transformer and the light and side of the connection of said BLIP to the FCS02 cable.

The communication protocol adopted provides for a periodical polling of all the various lights by the computer, which sends their messages composed of two words, the first containing the address of the individual Remote Module (that is the individual light) and the other the command to be carried out. For each word sent an error test is carried out by another bit of equal parity. The commands which the computer can send to the Remote Module are essentially four:

ON=command for switching on the light

OFF=command for switching off the light

RESET=command for switching the light on again (after replacement)

BLINK=flashing

The individual concentrator, if it recognises the address as belonging to a Remote Module of its relative Main Station send it to the appropriate Main Module, otherwise it ignores it and the messages passes to the successive concentrator in the said ring network connecting it. The Main Module, having decodified the message received, sends the relative command to the relevant Remote Module. This carries out the command and sends a return message to the Main Module containing the command received and the actual state of the light checked.

This is illustrated in the table hereinbelow.

| COMMAND SENT | REPLY |
|---|---|
| ON | ON + DIRTY |
| OFF | OFF + DIRTY |
| ON | ON + BURNT OUT + DIRTY |
| OFF | OFF + BURNT OUT + DIRTY |
| ON | ON |
| OFF | OFF |
| ON | ON + BURNT OUT |
| OFF | OFF + BURNT OUT |

As one can see, the only states which cannot be contemporaneously present are "ON" and "OFF" and in the case of replies from the Remote Module which differ from those foreseen, the Main Module re-transmits the same command a few times. If a "sound" reply is not obtained the Main Module sends a breakdown signal to the computer for that particular Remote Module.

In the table reported hereinbefore the "RESET" command has not been considered. This, in fact, is sent by the computer to the individual remote module only after the replacement of the relative bulb, which otherwise would not automatically switch on again. After that at least three "ON" and "OFF" commands are sent to test it. The Main Module re-transmits, by means of the concentrator, a return message to the computer containing the address of the Remote Module which has received the command as well as the state that the latter has communicated or, if appropriate, an indication of any malfunction. By carrying out a polling periodically of all the various lights, the computer can thus have an up-to-date picture of all the airport lights. This is however, only one of the functions it fulfils.

In general, depending on the software used, the computer is able to carry out a whole series of functions which allow it to completely control the airport traffic.

Amongst these functions:

maintenance of its data base, which contains information on the attributes and positions of the light sources and physical components of the control system, the attributes and positions of the aircraft, the transactions etc.:

control and processing of the requirements of the operators:

survey of the approaching aircraft:

survey of the state of the aircraft in movement;

survey of the other objects in movement;

testing of the state of the light sources;

control of the alarms and states of emergency;

control of the communication protocol;

various reports and statistics.

The computer, on the basis of the statistics of duration of the bulbs, is also able to indicate to the operator the moment in which a certain bulb should be replaced, even if it is not yet burnt out.

It may present the results of its testing and control activity to the operator by means of a visual display, luminous panels, a printer or other suitable methods.

If the area of the airport is too vast, or if installation of a distinct traffic control system for different zones is desired, it is possible to utilise more than one control system like the one described in which the relative computers are interconnected in a network to each other and to a central hierarchically superior processor, which may also be remote.

In this case the computers of each system, though being equipped with a certain autonomy, will carry out a control function and pre-processing of data which will in any case be sent to the central processor, which will give them the appropriate commands to carry out.

In conclusion, the control system described will allow complete control of the airport signalling lights as well as, more generally, the airport ground traffic, achieving a system which is completely independent from that being controlled. Therefore, in the case of a breakdown, either in the work circuit or in the control circuit, it is always able to operate either in indentification of the breakdown or in the management of the system.

Finally, it should be remembered that numerous additions, modifications and/or substitutions with components with equivalent functions may be brought to the system which has been described and illustrated, without thus going beyond the inventive idea it is based on, nor going out of its scope of protection which is also defined in the appended claims.

Furthermore, as already mentioned hereinbefore, the same system, with or without variations, may be installed also for checking and controlling an illumination plant for roads, motorways, (entrance ramps) or large industrial areas.

We claim:

1. In an automatic control system for the lights of an illumination plant in a series circuit, in particular for airport signalling lights, physically separated from the work circuit feeding said lights and galvanically separated from the latter, comprising:

a computer;

several Main Stations each containing several Main Modules, each controlling several Remote Modules which check and act on a single airport light, each of said Main and Remote Modules comprising firmware boards;

a full duplex data transmission network linking said computer with said Main Stations;

the improvement including: each Remote Module has externally two pairs of electric terminals of which one said pair is connected to the secondary of an insulating transformer making part of said work circuit and the other pair is connected to a light or a group of lights being controlled, said two pairs of electric terminals being connected to each other by electrical leads, wherein connected in series to one of the electrical leads is a coil which is magnetically coupled to a Hall sensor of the Remote Module; and further including an electronic device with controlled conduction having two conducting terminals and a control terminal, each conducting terminal connected with one of said electric leads while the control terminal is connected to circuitry which connects said electronic device magnetically to internal circuitry of the Remote Module itself.

2. Control system as in claim 1, wherein it activates switching on or switching off of each individual airport light, independently from commutators of said work circuit, giving the Remote Module controlling it commands which, respectively, bring said electronic device to complete cut-off or full conduction, as in the first case there is no current absorption by the electronic device from the two electrical leads which connect together the two said pairs of electric terminals of the Remote Module and short circuiting the same and thus the airport light which is fed by these in the second case.

3. Control system as in claim 2, wherein when a certain airport light is burnt out, said coil in series with one of said electric leads which connect together the two pairs of electric terminals of the Remote Module controlling said light, no longer communicating the passage of the current towards the light to said Hall sensor to which it is magnetically coupled, circuitally causes said electronic device to be brought to a state of partial conduction that simulates to the secondary of said insulation transformer the load determined by a functioning light in order not to create imbalances in said work circuit and contemporaneously causes a "condition of the light" parameter stored in relative memory of said internal circuitry of the Remote Module to be changed from "ON" to "BURNT OUT".

4. Control system as in claim 1 wherein each Remote Module is able to control several airport lights contemporaneously, provided that these are grouped within the same physical location.

5. Control system as in claim 2 wherein each Remote Module is able to control several airport lights contemporaneously, provided that these are grouped within the same physical location.

6. Control system as in claim 3 wherein each Remote Module is able to control several airport lights contemporaneously, provided that these are grouped within the same physical location.

7. Control system as in claim 1, wherein said full duplex data transmission network comprises:

a ring network which connects to each other said Main Stations, which have access to it by means of a plurality of Concentrators;

a network connecting the ring network to said computer by means of a Concentrator Node positioned therebetween;

a plurality of cables which connect each of said Main Modules to associated ones of said Remote Modules.

8. Control as in claim 2, wherein said full duplex data transmission network comprises:

a ring network which connects to each other said Main Stations, which have access to it by means of suitable Concentrators;

a network connecting the ring network to said computer by means of a Concentrator Node positioned therebetween;

a plurality of cables which connect each of said Main Modules to associated ones of said Remote Modules.

9. Control system as in claim 3, wherein said full duplex data transmission network comprises:

a ring network which connects to each other said Main Stations, which have access to it by means of suitable Concentrators;

a network connecting the ring network to said computer by means of a Concentrator Node positioned therebetween;

a plurality of cables which connect each of the said Main Modules to associated ones of said Remote Modules.

10. Control system as in claim 4, wherein said full duplex data transmission network comprises:

a ring network which connects to each other said Main Stations, which have access to it by means of suitable Concentrators;

a network connecting the ring network to said computer by means of a Concentrator Node positioned therebetween;

a plurality of cables which connect each of the said Main Modules to associated ones of said Remote Modules.

11. Control system as in claim 5, wherein said full duplex data transmission network comprises:

a ring network which connects to each other said Main Stations, which have access to it by means of suitable Concentrators;

a network connecting the ring network to said computer by means of a Concentrator Node positioned therebetween;

a plurality of cables which connect each of the said Main Modules to associated ones of said Remote Modules.

12. Control system as in claim 6, wherein said full duplex data transmission network comprises:

a ring network which connects to each other said Main Stations, which have access to it by means of suitable Concentrators;

a network connecting the ring network to said computer by means of a Concentrator Node positioned therebetween;

a plurality of cables which connect each of the said Main Modules to associated ones of said Remote Modules.

13. Control system as in claim 7, wherein in said network connecting said ring network to said computer, there is a second computer which is constantly updated with the information contained in the first and may substitute it in any moment that the latter undergoes a breakdown.

14. Control system as in claim 7, wherein:

each of said Main Stations is fed autonomously by two buffered feeders, of which one functions as a reserve;

said Remote Modules are fed by an additional electric lead by feeders distributed along said cables which connect them to said Main Module which commands it, said additional lead being connected electrically between an external sheath of said cables and insulated from a lead where the two-way transmission of data takes place.

15. Control system as in claim 1, wherein connected to each Remote Module is a sensor applied to the airport light, able to evaluate the condition of transparency of the glass which covers the light itself, and adding to a present "condition of the light" parameter stored in memory of said Remote Module, information of "DIRTY" light when the sensor communicates this condition to the internal circuitry of the Remote Module.

16. Control system as in claim 2, wherein connected to each Remote Module is a sensor applied to the airport light, able to evaluate the condition of transparency of the glass which covers the light itself, and adding to a present "condition of the light" parameter stored in memory of said Remote Module, information of "DIRTY" light when the sensor communicates this condition to the internal circuitry of the Remote Module.

17. Control system as in claim 1, wherein said computer periodically sends to individual Remote Modules messages containing the address which identifies them in said full-duplex data transmission network and the command to be carried out, which may be that of switching on or switching off or that of switching on again after replacement of an associated light, and the individual Remote Modules send back by means of the Main Module which drives it, a message containing its address as well as information stored in memory thereof on "Condition of the light" controlled, thereby providing said computer with current functional condition information of the individual airport lights and if necessary activating alarms or signals provided for a human operator.

18. Control system as in claim 1 wherein the Remote Module controls and acts on two airport lights independently.

19. Control system as in claim 1 wherein the remote Module identifies 16 separate inputs of respective sensors and commands 6 separate outputs for their diagnosis or to control particular functions.

20. Control system as in claim 1, wherein this system is utilizable in illumination plants for roads, motorways or large industrial areas.

21. Control system as in claim 1, wherein said electronic device comprises a triac.

22. Control system as in claim 1, wherein said circuitry which connects said electronic device magnetically comprises an optical isolator.

23. Control system as in claim 7, wherein said network comprises an Ethernet network.

* * * * *